Patented Mar. 24, 1936

2,035,325

UNITED STATES PATENT OFFICE 2,035,325

PROCESS OF PREPARING SULPHURIC ACID ESTERS OF LEUCO DERIVATIVES OF VAT DYESTUFFS

Hans Lecher, Leverkusen-I. G. Werk, Wilhelm Bauer and Ludwig Zeh, Leverkusen-Wiesdorf, and Bernhard Bollweg, Leverkusen-I. G. Werk, Germany, assignors, by mesne assignments, to Durand & Huguenin A.-G., Basel, Switzerland, a corporation of Switzerland No Drawing. Application September 29, 1932, Serial No. 635,458. In Germany October 7, 1931

7 Claims. (Cl. 260—52)

The present invention relates to a process of preparing sulphuric acid esters of leuco derivatives of vat dyestuffs.

In U. S. Patent 1,448,251 there is described a process for the manufacture of ester-like, water soluble compounds of vat dyestuffs by causing leuco compounds of the latter to react with sulphur trioxide or agents being capable of splitting off sulphur trioxide, in the presence of a tertiary organic base.

In accordance with the present invention the same products are obtained in a considerably simpler manner and without isolating the leuco derivatives. The method of working according to the invention is by reducing the vat dyestuffs by means of practically anhydrous alkali metal sulphides in an appropriate tertiary organic base in the presence or absence of a suitable organic solvent or diluent being inert to the starting materials, such as chlorobenzene, ortho-dichlorobenzene etc. Sulphur trioxide or an agent containing free sulphur trioxide or one being capable of splitting off the latter under the conditions of working, is then caused to react upon the reaction mixture obtained in the above reduction process, and, if desired, the esters being formed are converted into soluble salts in the usual manner.

The more detailed method of working may be as follows:—

The dyestuff to be transformed into the desired ester is dissolved or suspended in a tertiary organic base, preferably a tertiary heterocyclic base or a hydrogenated tertiary isocyclic base, such as pyridine or a homologue thereof, quinoline, hexahydrodimethylaniline etc. In many cases it will be advantageous to add besides the tertiary organic base a small amount of a secondary heterocyclic base, such as piperidine or hexahydroquinoline, by which addition the reduction is often facilitated. In case pyridine is used as the tertiary organic base, the addition of a secondary heterocyclic base will generally be of no great effect.

To the mixture thus obtained an alkali metal sulphide, such as $Na_2S$, $NaSH$, $Na_2S_2$, $K_2S$, $KSH$, $K_2S_2$ etc. is added, preferably in a finely powdered form, while excluding air from the reaction mixture. Reduction of the dyestuff performs at normal or even lower temperature, but is accelerated in some case by slightly heating. Preferred temperature ranges are those between about 10 and about 70° C. The addition of small amounts of methyl or ethyl alcohol or another solvent tending to increase the solubility of the alkali metal sulphide in the reaction mixture is often of advantage. Furthermore, stirring or shaking of the reaction mixture is desirable to accelerate the reduction process.

When reduction of the vat dyestuff is complete, an esterifying agent is added to the reaction mixture. As esterifying agents may be applied sulphur trioxide, agents containing sulphur trioxide or agents being capable of splitting off sulphur trioxide under the conditions of working, such as chlorosulphonic acid, esters thereof, fuming surphuric acid, the anhydrous sodium salt of chlorosulphonic acid or another salt of chlorosulphonic acid etc., and it may be mentioned that we generally prefer to apply the esterifying agent in admixture with a tertiary organic base. The esterifying agents are advantageously applied in an amount that more than two molecular proportions of sulphur trioxide are available on one molecular proportion of the leuco derivative of the vat dyestuff to be esterified. Esterification already performs at low temperatures, but slightly elevated temperatures are likewise operable and tend to accelerate the esterification process. Generally, we prefer to apply temperatures between about 10 and about 60° C. The sulphuric acid esters are thus obtained in form of their salts with the tertiary base applied. The working up of the reaction mixture is best performed by adding an alkali, such as sodium or potassium carbonate to the reaction mixture, whereby an alkali metal salt of the ester is formed, distilling off the tertiary base in vacuo or by steam distillation, dissolving the residue in water, filtering and salting out. Obviously, esterification can likewise be performed by pouring the reduction mixture obtained by the first step of our process into a mixture of the esterifying agent and a tertiary organic base and further working as described above.

According to another feature of the invention the reduction and esterification may be performed in the following manner:—

The vat dyestuff is suspended in a tertiary organic base, particularly a tertiary heterocyclic base or a hydrogenated tertiary isocyclic base, an esterifying agent, as mentioned above, is added, the air in the reaction vessel is replaced by nitrogen or another inert gas, technically anhydrous sodium sulphide or another alkali metal sulphide is then added, and the mixture thus obtained is slowly stirred or milled, care being taken that the temperature does not surmount about 10–20° C. As an alternative, the dyestuff may be added to a mixture of a tertiary organic base and an esterifying agent of the kind above referred to. An alkali sulphide is then added and the reduction performed as described above.

As soon as all of the vat dyestuff is reduced, the reaction mixture is further stirred, advantageously while heating it up to about 70° C., in order to accelerate and complete the esterification process, but it may be mentioned that the total process (reduction and esterification) may be performed at normal temperature.

These latter methods of working are considered equivalents to the method of working described before.

It should be stated that in all cases the presence of water and of oxygen (air) is to be avoided as far as possible, as well during the reduction process as during the esterification process.

The following examples illustrate the invention, without, however, restricting it thereto, the parts being by weight:—

Example 1

580 parts of 5,7,5',7'-tetrabromoindigo are stirred into 2000 parts of anhydrous pyridine. 160 parts of technically pure anhydrous sodium sulphide are added to the mixture, while stirring and excluding air. Reduction of the tetrabromoindigo begins at once under self-heating. After the reduction is complete, the brownish colored reaction mixture is stirred into a mixture consisting of 800 parts of chlorosulphonic acid and 3200 parts of practically anhydrous pyridine, while excluding air, and the mixture thus obtained is slowly heated to 40–50° C. The working up of the reaction mixture and the transformation of the pyridine salt of the ester thus obtained into its sodium salt is performed in the usual manner.

Example 2

290 parts of thioindigo are reduced with about 160 parts of practically anhydrous sodium sulphide in the presence of 2000 parts of practically anhydrous pyridine, and esterified as described in Example 1 with a mixture of 2500 parts of practically anhydrous pyridine and 600 parts of chlorosulphonic acid. The pyridine salt of the reaction product thus obtained is transformed into its sodium salt or its well crystallizing potassium salt in the usual manner.

When replacing in this example the thioindigo by 386 parts of the dyestuff of the probable formula:—

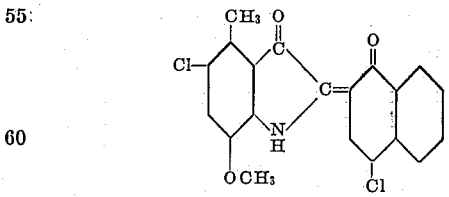

or by 7, 7'—dinitrothioindigo, the leuco sulphuric acid esters of the corresponding dyestuffs are likewise obtained in a good yield, whereby it may be mentioned that in case of using vat dyestuffs containing nitro groups, especially those of the indigoid series, the nitro groups are present unaltered in the esters obtained.

Example 3

262 parts of indigo and 200 parts of anhydrous sodium sulphide are introduced in a carbon dioxide atmosphere into a mixture of 3000 parts of pyridine, 200 parts of ethyl alcohol and 10 parts of piperidine. Reduction soon begins under self-heating and finishes with the formation of a greenish-yellow paste of the leuco compound. The mixture is then introduced into an esterification mixture consisting of 850 parts of chlorosulphonic acid and 3500 parts of pyridine at 20° C. while excluding air, and the mixture thus obtained is heated to 40–50° C. for several hours. The pyridine is then distilled off in vacuo and the ester transformed into its sodium salt in the usual manner.

Example 4

580 parts of 5,7,5',7'-tetrabromoindigo are stirred in a carbon dioxide atmosphere into a mixture of 3000 parts of dimethylaniline and 80 parts of ethyl alcohol. 200 parts of technically anhydrous 90% sodium sulphide are added and reduction is performed as described in the above examples. The reduction can be accelerated by the addition of, for example, 10 parts of piperidine. After reduction is complete, the mixture is introduced into an esterification mixture consisting of 900 parts of chlorosulphonic acid, 2300 parts of dimethylaniline and 4600 parts of chlorobenzene, whereafter the mixture is heated to 45° C., until esterification is complete. The reaction product can be isolated by pouring the reaction mixture into water, whereby the dimethylaniline salt of the leuco sulphuric acid ester of 5,7,5',7',tetrabromoindigo separates. It can be transformed into its sodium or potassium salt in the usual manner.

Example 5

A mixture is prepared from 5000 parts of pyridine, 1200 parts of chlorosulphonic acid, 578 parts of 5,7,5',7'-tetrabromoindigo and 240 parts of technically anhydrous sodium sulphide. This mixture is milled into a ball mill, in a carbon dioxide atmosphere, for 12 hours at a temperature of about 15–20° C. Thereupon the temperature is slowly raised to 40–45° C. and maintained for 3–4 hours while stirring, until esterification is complete. The further working up is performed in the usual manner, for example, by rendering the mixture alkaline by means of sodium carbonate, subjecting the same to steam distillation and salting out. The yield of the reaction product obtained is almost quantitative.

Example 6

384 parts of 6,6'-diethoxy-thioindigo are stirred with 3000 parts of pyridine and 120 parts of technically water free sodium sulphhydrate (NaSH) for half an hour, whereby reduction of the diethoxy-thioindigo occurs under self-heating. The yellowish brown reaction mixture thus obtained is introduced into a mixture of 3000 parts of pyridine and 800 parts of chlorosulphonic acid, and the mixture thus obtained is stirred for 12 hours at 30–40° C. As well the reduction process as the esterification process are performed with the exclusion of air, for example, in a nitrogen atmosphere.

After esterification is complete, the pyridine is distilled off in vacuo and the reaction product obtained in transformed into the sodium salt of the acid sulphuric acid ester of leuco-6,6'-diethoxy-thioindigo in the usual manner.

Example 7

451 parts of 5,6,7-trichlorothionaphthene-5',7'-dichloro indole indigo are reduced to the corresponding leuco compound by means of 120 parts of anhydrous 95% sodium sulphide in the presence of 2500 parts of water free technically pure pyridine. 550 parts of the sodium salt of chlorosulphonic acid are added at a temperature of about 5-10° C., and the mixture thus obtained is heated to about 60° C., until all of the leuco compound present has been esterified. The working up of the reaction mixture may be performed in the usual manner.

*Example 8*

516 parts of dimethoxy-dibenzanthrone (see Colour Index No. 1101) are stirred at normal temperature and in a nitrogen atmosphere with 2500 parts of pyridine and 150 parts of anhydrous sodium sulphide, until all of the dyestuff is reduced to its leuco compound. The mixture thus obtained is introduced at about 15° C. into an esterification mixture consisting of 1100 parts of chlorosulphonic acid and 4000 parts of pyridine. Esterification is completed by heating the esterification mixture to about 45° C. In this manner there is obtained the pyridine salt of the acid sulphuric acid ester of leuco dimethoxydibenzanthrone, which can be transformed into its sodium salt in the usual manner.

When replacing in this example the dimethoxy-dibenzanthrone by 332 parts of 3,4,8,9-dibenzopyrenequinone, the acid leuco sulphuric acid ester of this dyestuff is likewise obtained in a good yield.

In some cases, especially when reducing and esterifying 5,5',7,7'-tetrabromoindigo, for example, according to the processes disclosed in Examples 1 and 4, it will be advantageous to add to the reaction mixture a mineral acid salt of the tertiary base applied or of another tertiary organic base, before reduction of the vat dyestuff takes place.

When using in the claims the term "alkali metal sulphide" the same is intended to include alkali metal mono-sulphides, alkali metal sulphhydrates and alkali metal polysulphides as more specifically outlined in the disclosure.

We claim:—
1. The process which comprises reducing a vat dye-stuff with an alkali metal sulphide in the presence of a tertiary organic base, and esterifying the reaction product without isolating it by means of an esterifying agent of the group consisting of sulphur trioxide, agents containing free sulphur trioxide and agents being capable of splitting off the latter under the conditions of working, the total process being performed under substantially anhydrous conditions and in the absence of oxygen.

2. The process which comprises reducing a vat dye-stuff with an alkali metal sulphide in the presence of pyridine and esterifying the reduction product without isolating it by means of an esterifying agent of the group consisting of sulphur trioxide, agents containing free sulphur trioxide and agents being capable of splitting off the latter under the conditions of working, the total process being performed under substantially anhydrous conditions and in the absence of oxygen.

3. The process which comprises distributing a vat dyestuff in pyridine, adding a compound of the group consisting of sodium sulphide and sodium sulphhydrate, and, after reduction is complete, esterifying the leuco derivative of the vat dyestuff without isolating it by the addition to the reaction mixture of an esterifying agent of the group consisting of chlorosulphonic acid and esters and alkali metal salts thereof, the esterification being performed at a temperature between about 10 and about 70° C. and the total process being performed under substantially anhydrous conditions and in the absence of oxygen.

4. The process which comprises suspending a vat dyestuff in pyridine, adding a compound of the group consisting of sodium sulphide and sodium sulphhydrate and a compound of the group consisting of chlorosulphonic acid and esters and alkali metal salts thereof, and mechanically moving the reaction mixture, care being taken that the temperature does not surmount about 20° C. as long as unreduced dyestuff is present and about 70° C., until esterification is complete, the total process being performed under substantially anhydrous conditions and in the absence of oxygen.

5. The process which comprises distributing 6,6'-diethoxythioindigo in pyridine, adding sodium sulphhydrate and, after reduction is complete, mixing the reaction mixture thus obtained with a mixture of pyridine and a compound of the group consisting of chlorosulphonic acid and esters and alkali metal salts thereof, the esterification process being performed at a temperature between about 30 and about 40° C. and the total process being performed under substantially anhydrous conditions and in the absence of oxygen.

6. The process which comprises introducing 5,7,5',7'-tetrabromoindigo and a compound of the group consisting of sodium sulphide and sodium sulphhydrate into a mixture of pyridine and of a compound of the group consisting of chlorosulphonic acid and esters and alkali metal salts thereof, and mechanically moving the mixture, care being taken that the temperature does not surmount about 20° C. as long as unreduced tetrabromoindigo is present and not about 70° C., until esterification is complete, the total process being performed under substantially anhydrous conditions and in the absence of oxygen.

7. The process which comprises mixing 5000 parts by weight of pyridine, 1200 parts by weight of chlorosulphonic acid, 578 parts by weight 5,7,5',7'-tetrabromoindigo and 240 parts by weight of technically anhydrous sodium sulphide and mechanically moving the mixture, the temperature being maintained between about 15 and about 20° C. for about 12 hours and between about 40 and about 45° C. for a further 3–4 hours, the total process being performed under substantially anhydrous conditions and in the absence of oxygen.

HANS LECHER.
WILHELM BAUER.
LUDWIG ZEH.
BERNHARD BOLLWEG.